United States Patent [19]

Minamikawa et al.

[11] Patent Number: 5,378,481
[45] Date of Patent: Jan. 3, 1995

[54] PROCESS FOR PRODUCING FOOD USING CHOCOLATE

[75] Inventors: Yoriko Minamikawa, Kaizuka; Hideki Baba, Sennan, both of Japan

[73] Assignee: Fuji Oil Company, Limited, Osaka, Japan

[21] Appl. No.: 655,375

[22] PCT Filed: Jul. 12, 1990

[86] PCT No.: PCT/JP90/00897

§ 371 Date: Mar. 6, 1991

§ 102(e) Date: Mar. 6, 1991

[87] PCT Pub. No.: WO91/00690

PCT Pub. Date: Jan. 24, 1991

[30] Foreign Application Priority Data

Jul. 13, 1989 [JP] Japan .................. 1-181901

[51] Int. Cl.$^6$ ........................................ A23P 1/08
[52] U.S. Cl. ................................ 426/99; 426/103; 426/306; 426/659
[58] Field of Search ............... 426/99, 103, 306, 101, 426/659

[56] References Cited

U.S. PATENT DOCUMENTS

| | | | |
|---|---|---|---|
| 3,784,713 | 1/1974 | Colten | 426/659 |
| 3,784,714 | 1/1974 | McReynolds | 426/659 |
| 3,809,764 | 5/1974 | Gabby et al. | |
| 3,958,024 | 5/1976 | Fissolo | 426/103 |
| 3,959,516 | 5/1976 | Warkentin | 426/306 |
| 4,045,583 | 8/1977 | Jeffery | 426/103 |
| 4,081,559 | 3/1978 | Jeffery | 426/103 |
| 4,086,370 | 4/1978 | Olds | 426/306 |
| 4,761,292 | 8/1988 | Augustine | 426/659 |
| 4,980,181 | 12/1990 | Camp | 426/306 |
| 5,017,392 | 5/1991 | Bombardier | 426/101 |
| 5,102,680 | 4/1992 | Glass | 426/659 |

FOREIGN PATENT DOCUMENTS

| | | |
|---|---|---|
| 715793 | 10/1968 | Belgium . |
| 1083636 | 1/1958 | Germany . |
| 1239056 | 7/1971 | United Kingdom . |
| 2023991 | 1/1980 | United Kingdom . |

OTHER PUBLICATIONS

Montagne 1961 Larousse Gastronomique Crown Publishers Inc New York p. 539.
Woman's Day Encyclopedia of Cookery vol. 5 1966 Fawcett Publishers Inc. New York pp. 750–752.

Primary Examiner—Carolyn Paden
Attorney, Agent, or Firm—Wenderoth, Lind & Ponack

[57] ABSTRACT

A process for producing chocolate-containing food with suppressed sweetening and deterioration of palatability during preservation thereof, which comprises bringing food or a raw material of food or its material containing at least 5% by weight of water into contact with chocolate prepared from sugars containing at least 40% by weight of a sugar component having a solubility (as defined by the gram number of sugar that can dissolve in 100 g or water at 20° C.) of 80 or less.

5 Claims, No Drawings

PROCESS FOR PRODUCING FOOD USING CHOCOLATE

FIELD OF THE INVENTION

The present invention relates to a process for producing food using chocolate and chocolate. More particularly, it relates to a process for producing food using chocolate having good quality, wherein a water-containing food and chocolate are used in combination to prevent a sweating phenomenon at the surface of chocolate during storage and hard mouth feel of chocolate itself, as well as chocolate to be used for such food.

BACKGROUND OF THE INVENTION

In general, chocolate is divided into tempering type chocolate produced by using cacao mass, cacao butter and/or a tempering type cacao butter substitute, sucrose, whole (skimmed) milk powder, an emulsifying agent and flavor as raw materials; and non-tempering type chocolate produced by using a non-tempering type cacao butter substitute, lauric type fats and oils or fats and oils having a wide range of plasticity in place of cacao butter or a tempering type cacao butter substitute; so-called colored chocolate in white, red, yellow or the like wherein no cacao mass is used; and the like. The term "chocolate" used herein is not limited to specific kinds of chocolate such as those prescribed by laws and regulations, and includes any kind of chocolate as described above. Heretofore, the above chocolate has been consumed as it is by solidifying it into a plate-like or block-like product. In addition to this, chocolate can be used for various food, for example, it is melted and used for coating on the surface of cake and bread such as a cream puff; it is used for a center filling of marshmallow or baked confectionery, Danish pastry, etc.; and further it is used for coating on the inner surface of a corn used as a container for ice confectionery such as soft ice cream. However, in such food using chocolate, when food itself contains a relatively large amount of water and when chocolate is coated on the surface of food, oils ooz out of the surface of chocolate during storage to cause a so-called "sweating phenomenon" and, at the same time, the gloss is deteriorated. Further, a gap is formed at the contacting surface between the chocolate and the food so that chocolate is liable to separate from the food, and further the chocolate becomes sticky and heat resistance thereof is lost. Although this sweating phenomenon is hardly caused in the case of a sponge cake, the gloss of chocolate is readily lost and chocolate becomes sticky. This sweating phenomenon is remarkable when food is stored in piles or packed in a bag. In addition, in the case of chocolate contained as a center filling in the interior of a water-containing dough such as marshmallow or baked confectionery, Danish pastry and the like, the chocolate itself becomes hard during baking or storage and it has hard mouth feel. Further, in the case of chocolate used as a coating for the inner side of a corn container for an ice confectionery, the moistureproof effect is not fully obtained due to the coating of chocolate and the crispy mouth feel of the corn itself is hardly maintained.

OBJECTS OF THE INVENTION

As described above, chocolate for coating and for the center filling of water-containing food which has been used heretofore has disadvantages that it exhibits a sweating phenomenon and hard mouth feel, occasionally, and the mechanism of this phenomenon has not yet been fully clarified. During the improvement of the above disadvantages, the present inventors have considered the transfer of water between the chocolate and food would be responsible for both the sweating phenomenon and the hard mouth feel of the chocolate as described above and, firstly, the transfer of water of each raw material of chocolate has been determined.

Namely, a vegetable fat was used alone; in the case of cacao mass, 0.5% lecithin was added; a raw material such as cocoa, powdered milk, sucrose, glucose or the like was mixed with an equal amount of a vegetable fat and subjected to rolling to obtain a sample. The sample was coated on the surface of a table roll (water content: about 29%). The vegetable fat was used in the form of a paste obtained by cooling it to precipitate crystals and cocoa mass was used by tempering without rolling and the other samples were kept at 50° C. Each sample was coated on the roll at 35° C., immediately cooled to 5° C. and solidified with standing for 5 to 10 minutes, packed and stored at 35° C., 30° C. and 20° C. for 4 days, respectively. Then, the water content of each raw material was measured. The water content was calculated as the raw material alone. Each increase rate of water content after storage when initial water content is taken as 1 is shown below.

| Raw material | 35° C. | 30° C. | 20° C. |
| --- | --- | --- | --- |
| Vegetable fat | 0.2 | 0.2 | 0.2 |
| Cacao mass | 5.2 | 4.6 | 4.4 |
| Cocoa | 8.1 | 7.1 | 7.0 |
| Skimmed milk powder | 5.1 | 4.5 | 5.0 |
| Starch | 2.0 | 2.0 | 2.1 |
| Starch hydrolyzate | 5.7 | 4.6 | 6.0 |
| Sucrose | 50.6 | 51.8 | 39.4 |
| Glucose | 76.2 | 70.2 | 33.8 |
| Lactose | 1.3 | 1.3 | 1.3 |

As described above, it has been found that the most remarkable water absorption is observed in sucrose and glucose which have been used as sugars in raw materials of chocolate.

The present inventors have made intense studies, based on the above results. As a result, it has been found that, by using a sugar having low water solubility as a sugar material in raw materials of chocolate, the above disadvantages can be improved.

SUMMARY OF THE INVENTION

The present invention has been completed based on the above finding and provides a process for producing food using chocolate which comprises bringing food or a raw material of food having a water content of not less than 5% by weight into contact with chocolate in which a sugar having a solubility of not more than 80 (grams dissolved in 100 g of water at 20° C.) are used in an amount of not less than 40% by weight based on the total weight of a sugar material. Further, according to the present invention, there is provided chocolate which comprises a sugar having solubility of not more than 80 (grams dissolved in 100 g of water at 20° C.) in an amount of not less than 40% by weight based on the total weight of a sugar material and containing a non-sugar sweetener.

DETAILED DESCRIPTION OF THE INVENTION

In the present invention, the objective food are water-containing food and raw materials of food having a water content of not less than 5% by weight and examples thereof include internal fillings of cream puff, eclair, croissant, roll, doughnut and sugar corn (e.g., ice confectionery or shell chocolate); bean jam-containing confectionery, marshmallow, Turkish delight, rice cake and the like; baked bean jam-containing type cookie or the like.

In the case of coating, although a disadvantage such as sweating phenomenon is scarcely caused in food or a raw material of food having a water content of less than 15% by weight, the present invention is effective in a dough having a low water content because, even in food having a water content of about 5% such as baked bean jam-containing type cookie, conditions that migration of water is readily caused are brought about by baking.

Further, in general, when the surface to be contacted with chocolate is not permeable to oil-drop, "sweating" improving effect is enhanced. For example, whether the surface is permeable to oil-drop or not can be decided by dropping an oil-drop from a dropping pippet (outlet: about 1 mm in diameter) on the surface of the dough to observe whether the oil-drop permeates the dough or not within about one minutes. In general, permeability to oil-drop can be observed within 30 seconds in the case of a sponge cake. In such a product, sweating phenomenon is hardly caused.

As the chocolate, there can be used any chocolate such as tempering type, non-tempering type or various colored chocolates and, in general, non-tempering chocolate or various colored chocolates using fats and oils having a wide range of plasticity are used. Typically, the fats and oils having a wide range of plasticity are those used for margarine or shortening and examples thereof include vegetable fats and oils such as rapeseed oil, soybean oil, sunflower seed oil, cotton seed oil, peanut oil, rice bran oil, corn oil, sufflower oil, olive oil, kapok oil, sesame oil, evening primerose oil, palm oil, shea butter, sal fat, coconut oil, palm kernel oil, etc.; and animal fats and oils such as milk fat, beef tallow, lard, fish oil, whale oil, etc. The above fats and oils alone or in combination thereof, or their processed fats and oils having melting point of 15° to 45° C., wherein fats and oils subjected to hydrogenation, fractionation, ester interchange treatment are suitable. In the present invention, these fats and oils may be used as all the fat components of chocolate. In the above chocolate, as the sugar material, there can be used sugars having a solubility of not more than 80 (grams dissolved in 100 g of water at 20° C.). When the solubility exceeds 80, the prevention of the sweating phenomenon or hard mouth feel can scarcely be obtained. As the sugars having the solubility of not more than 80, for example, there are mannitol, maltose, erythritol, lactose, starch, starch hydrolyzates and the derivatives thereof and the like, and one or more of these materials can be used in an amount of not less than 40% by weight, based on the total weight of the sugar materials. When the amount to be used is smaller than 40% by weight based on the total weight of the sugar materials, the effect can scarcely obtained.

In the case of coating food such as sponge cake with chocolate, an oily material such as butter cream is primed on the surface of food so that the surface of food becomes flat to easily conduct coating and chocolate coated does not penetrate the food. Although this is slightly effective for prevention of sweating phenomenon, the effect thereof is not sufficient in comparison with the present invention. In the present invention, the sweating phenomenon can be fully prevented by simply and directly coating without using any oily layer. In addition, in the specification of Japanese Patent Kokoku No. 54-8738, there is disclosed a process for producing chocolate using $\beta$-lactose in order to reduce sweetness and, in this publication, there is no disclosure and suggestion that sweating phenomenon and deterioration of the heat resistance can be controlled because $\beta$-lactose has a low solubility to water.

Further, the purpose of the present invention is not to reduce the sweetness of the chocolate. To the contrary, since the sweetness of sugar having a low solubility is too low, it is preferred that a non-sugar sweetener which has strong sweetness in comparison with saccharide sweeteners is used in combination in order to maintain the sweetness at a normal level. As the non-sugar sweetener, there are known sweeteners, for example, natural sweeteners such as amino acids (e.g., glycine, alanine and the like), stevioside, glycyrrhizin, somatine, etc. and synthetic sweeteners such as saccharin, aspartame, etc. In addition, when the objective food itself is one having a strong sweetness, the chocolate may be suitably used in the state of low sweetness.

The following Examples and Comparative Examples further illustrate the present invention in detail but are not to be construed or limited in the scope thereof. In the Examples and Comparative Examples, all "parts" and "percents" are by weight unless otherwise stated.

EXAMPLE 1

By using cocoa (15 parts), mannitol (43 parts), vegetable fat (42 parts) and a suitable amount of lecithin and flavor, chocolate was produced according to a conventional manner. A commercially available cream puff (about 80 mm in diameter; 45 mm in height; 67 to 70 g in weight; custard cream having a water content of about 60% as a filling was contained therein) was coated with the resulting chocolate. The coating method was as follows. the head part of the cream puff was dipped upside-down into a chocolate bath having a product temperature of about 40° C. in which chocolate was melted to coat the head part of the cream puff with chocolate (about 8 g). The drying time was 3 minutes and 30 seconds. After drying, some of them were packed in a bag and the other unpacked and they were stored at 10° C. and 20° C. As a result, after 3 days, no sweating phenomenon was observed on the surface of the chocolate and it showed good gloss.

EXAMPLE 2

According to the same manner as described in Example 1, chocolate was produced and coating was conducted except for using $\beta$-lactose in place of mannitol. As a result, no sweating phenomenon was observed and it showed good gloss, like Example 1.

COMPARATIVE EXAMPLE 1

According to the same manner as that described in Example 1, chocolate was produced and coating was conducted except for that sucrose was used in place of mannitol. As a result, regarding both packed chocolates stored at 10° C. and 20° C., a sweating phenomenon was observed even after 1 day and the surface of chocolate was changed to dark brown color and gloss was lost. Regarding unpacked chocolate, a similar phenomenon was observed after 2 days.

EXAMPLE 3

According to the same manner as that described in Example 1, chocolate was produced and coating was carried out except for using sucrose in place of one quarter of the amount of mannitol. As a result, no sweating phenomenon was observed even after 2 days and it showed good gloss.

EXAMPLE 4

By using cacao mass (4 parts), cocoa (13 parts), milk solid (5 parts), mannitol (32 parts), vegetable fat (46 parts) and a suitable amount of lecithin and flavor, chocolate was produced according to a conventional manner. A commercially available cream puff (about 80 mm in diameter; 45 mm in height; 67 to 70 g in weight; whip cream having a water content of 40% as a filling was contained therein) was coated with the resulting chocolate. Coating method was as follows. The head part of the cream puff was dipped upside-down into a chocolate bath having a product temperature of about 40° C. in which chocolate was melted to coat the head part of the cream puff with chocolate (about 8 g). The drying time was 3 minutes and 50 seconds. After drying, chocolate was packed in a bag and then stored at 10° C. and 20° C. As a result, after 3 days, no sweating phenomenon was observed on the surface of chocolate and it showed good gloss.

COMPARATIVE EXAMPLE 2

According to the same manner as that described in Example 4, chocolate was produced and coating was conducted except for using sucrose in place of mannitol. As a result, regarding both packed chocolates stored at 10° C. and 20° C., sweating phenomenon was observed even after 1 day and the surface of chocolate was changed to a dark brown color and gloss was lost.

EXAMPLE 5

According to the same manner as that described in Example 4, chocolate was produced and coating was conducted except for using lactose (24 parts) and sucrose (8 parts) in place of mannitol. As a result, no sweating phenomenon was observed, even after 2 days and it showed good gloss.

EXAMPLE 6

By using cacao mass (12 parts), cocoa (5 parts), milk solid (4 parts), lactose (52 parts), rapeseed hydrogenated oil (27 parts) and a suitable amount of lecithin, flavor and a sweetener, chocolate was produced according to a conventional method. The resulting chocolate was covered with a cookie dough of 8 g (water content: 8%) and was baked with only a high flame at 230° C. for 8 minutes.

Regarding the chocolate-containing cookies thus obtained, the chocolate of the center part did not lose softness thereof, even after 3 days at 20° C. and showed a good mouth feel.

COMPARATIVE EXAMPLE 3

According to the same manner as that described in Example 6, chocolate was produced and a cookie was baked except for using sucrose in place of lactose. As a result, the resulting chocolate showed a harder mouth feel in comparison with that obtained in Example 6.

EXAMPLE 7

By using nuts (15 parts), mannitol (50 parts), sugar (15 parts), cocoa butter (6 parts), palm middle melting point fraction (14 parts) and a suitable amount of an emulsifying agent and a flavor, chocolate was produced according to a conventional method. The resulting chocolate as a center filling was covered with Danish pastry dough (water content: 23%) and was baked in an oven (200° C.; 15 minutes).

Regarding the chocolate-containing Danish pastry thus obtained, the chocolate of the center part did not lose softness after 3 days at 20° C. and showed a good mouth feel.

EXAMPLE 8

According to the same manner as that described in Example 7, chocolate was produced and Danish pastry was baked except for using lactose in place of mannitol. As a result, the resulting chocolate showed a softer mouth feel in comparison with that obtained in Example 7.

COMPARATIVE EXAMPLE 4

According to the same manner as that described in Example 7, chocolate was produced and Danish pastry was baked except for using sucrose in place of mannitol. As a result, chocolate as a center filling showed a harder mouth feel in comparison with that obtained in Example 7.

EXAMPLE 9

By using whole milk powder (7 parts), skimmed milk powder (5 parts), lactose and β-lactose (2:8, 38 parts), sugar (4 parts), vegetable fat (46 parts) and a suitable amount of lecithin and a flavor, white chocolate was produced according to a conventional method. A commercially available bread (water content: 28%) was coated with the resulting white chocolate in a line pattern and stored at 30° C. and, as a result, no sweating phenomenon was observed at the surface of chocolate after 3 days and it showed good gloss and maintained the same state as that obtained immediately after coating.

To the contrary, regarding chocolate produced by using only sucrose for comparison, a sweating phenomenon was observed at the surface of chocolate and chocolate released after storage. Further, chocolate obtained by using a fondant melted after storage and did not maintain the original form.

Furthermore, the coating of chocolate produced by further adding a sweetener (stevia: having 125-fold sweetness in comparison with sucrose) in various amounts was conducted likewise and sweetness was evaluated by 15 panelists to obtain the following results.

| Amount of sweetener | Number of persons who have judged as good |
|---|---|
| 0 part | 0 |
| 0.05 part | 2 |
| 0.10 part | 7 |
| 0.15 part | 5 |
| 0.20 part | 1 |

As is clear from the above results, it is preferred that a sweetener (stevia) is added in an amount of about 0.1 to 0.15 parts.

EXAMPLE 10

By using whole milk powder (7 parts), lactose (60 parts), vegetable fat or oil (33 parts), a sweetener (stevia; 0.1 parts) and a suitable amount of lecithin and flavor, white chocolate was produced according to a conventional method. The white chocolate thus obtained was used as a center filling of a Turkish delight by using a bean jam-filling machine ant was stored at 25° C. and, as a result, no change was observed in a physical property of chocolate after 3 days and it has maintained good state.

To the contrary, chocolate produced by using sucrose (8 parts) in place of lactose (60 parts) for comparison became dry up crisp and hard after storage. Further, Turkish delight itself became hard.

EXAMPLE 11

By using whole milk powder (4 parts), lactose (48 parts), sugar (8 parts), vegetable fat (33 parts) and a suitable amount of lecithin and flavor, chocolate was produced according to a conventional method. The chocolate thus obtained was used as a center-filling of Daifuku rice cake by using a bean jam-filling machine and was stored at 25° C. and, as the result, no change was observed in a physical property of chocolate after 3 days and it maintained good state.

To the contrary, chocolate produced by using no lactose and sucrose (56 parts) for comparison became dry up crisp and hard after storage. Further, the dough of rice cake itself became hard.

As described above, by using a specific sugar, sweating phenomenon or hard mouth feel of chocolate itself of confectionaries which is coated with chocolate or filled with chocolate can be prevented. In addition, by a moistureproof effect to a corn container for ice confectionery, crispy mouth feel can be remained.

What is claimed is:

1. A process for producing a chocolate-containing cake, confectionery, pastry, cookie, or bread, which comprises contacting a cake confectionery, pastry, cookie or bread having a water content of not less than 15% by weight with a chocolate and sugar-containing mixture in which a sugar having a solubility of not more than 80 grams, dissolved in 100 g of water at 20° C., is used in an amount of not less than 40% by weight, based on the total weight of the sugar material in the mixture, whereby the sweating phenomenon of the chocolate due to the aforementioned water content in the confectionery, pastry, cookie or bread is prevented, and wherein the chocolate-containing cake bread, confectionery, pastry or cookie is distributed and stored in piles or in a packed state.

2. A process according to claim 1, wherein the food using chocolate is distributed and stored in piles or in packed state.

3. A process according to claim 1, wherein said chocolate cake, bread, confectionary, pastry or cookie is a member selected from the group consisting of cream puffs, eclairs, croissants, rolls, doughnuts, marshmallows, baked confectioneries, Danish pastries, jam-containing confectioneries, Turkish delights, rice cakes and baked bean jam-containing cookies.

4. A process according to claim 1 wherein the sugar, having a solubility of not more than 80 grams, is selected from the group consisting of mannitol, maltose, erythritol, lactose and starch hydrolyzates.

5. A process according to claim 1 wherein chocolate-containing cakes or breads are produced.

* * * * *